(12) United States Patent
Li et al.

(10) Patent No.: US 9,330,359 B2
(45) Date of Patent: May 3, 2016

(54) DEGREE OF CLOSENESS BASED ON COMMUNICATION CONTENTS

(71) Applicant: Empire Technology Development LLC, Wilmington, DE (US)

(72) Inventors: Daqi Li, Shaanxi (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 165 days.

(21) Appl. No.: 14/122,971

(22) PCT Filed: Nov. 20, 2012

(86) PCT No.: PCT/CN2012/084878
§ 371 (c)(1),
(2) Date: Nov. 27, 2013

(87) PCT Pub. No.: WO2014/078984
PCT Pub. Date: May 30, 2014

(65) Prior Publication Data
US 2015/0193684 A1 Jul. 9, 2015

(51) Int. Cl.
*G06F 17/00* (2006.01)
*G06N 7/00* (2006.01)
*G06N 7/08* (2006.01)
*G06N 5/04* (2006.01)
*G06F 17/30* (2006.01)

(52) U.S. Cl.
CPC ............ *G06N 5/04* (2013.01); *G06F 17/30964* (2013.01)

(58) Field of Classification Search
None
See application file for complete search history.

(56) References Cited

U.S. PATENT DOCUMENTS

| 8,139,495 | B2* | 3/2012 | Gollapudi | H04L 12/581 370/252 |
| 8,171,055 | B2 | 5/2012 | Min et al. | |
| 8,484,245 | B2* | 7/2013 | Ha-Thuc | G06F 17/30705 707/749 |
| 8,566,360 | B2* | 10/2013 | Chen | G06F 17/30598 707/794 |
| 8,620,772 | B2* | 12/2013 | Owen | H04W 4/001 705/26.62 |
| 8,762,852 | B2* | 6/2014 | Davis | G06Q 30/0201 700/94 |

(Continued)

FOREIGN PATENT DOCUMENTS

CN 101123532 A 2/2008
CN 102111730 A 6/2011

(Continued)

OTHER PUBLICATIONS

Modeling and performance analysis of user equipment with sleep modes and activation overhead Kuhn, P.J. Communications and Electronics (ICCE), 2012 Fourth International Conference on Year: 2012 pp. 221-226, DOI: 10.1109/CCE.2012.6315902 Referenced in: IEEE Conference Publications.*

(Continued)

*Primary Examiner* — Michael B Holmes
(74) *Attorney, Agent, or Firm* — Brundidge & Stanger, P.C.

(57) ABSTRACT

In one example, a method may include monitoring contents of communications between a first user and a second user, determining a degree of closeness between the first user and the second user utilizing an ontological model, with the degree of closeness being based at least in part on the contents of communications between the first user and the second user, and updating the degree of closeness based at least in part on a frequency of communications between the first user and the second user.

39 Claims, 7 Drawing Sheets

(56) References Cited

U.S. PATENT DOCUMENTS

| | | | | |
|---|---|---|---|---|
| 8,819,172 | B2* | 8/2014 | Davis | H04W 4/001 382/100 |
| 8,831,279 | B2* | 9/2014 | Rodriguez | G06T 11/60 382/103 |
| 8,838,597 | B1* | 9/2014 | Gottumukkala | G06F 17/30946 707/736 |
| 8,848,970 | B2* | 9/2014 | Aller | H04M 1/72522 345/632 |
| 8,930,453 | B2* | 1/2015 | Panyam | G06Q 50/01 709/204 |
| 8,930,959 | B2* | 1/2015 | Lahr | G06F 9/5038 718/106 |
| 8,935,291 | B2* | 1/2015 | Chen | G06F 17/30734 707/794 |
| 8,965,974 | B2* | 2/2015 | Abrol | H04L 67/22 709/204 |
| 9,008,353 | B2* | 4/2015 | Aller | H04M 1/72522 345/632 |
| 9,031,607 | B1* | 5/2015 | Cope | H04W 48/18 370/203 |
| 9,086,789 | B2* | 7/2015 | Yelsey | G06N 5/02 |
| 9,088,560 | B1* | 7/2015 | Newstadt | H04L 63/08 |
| 9,105,083 | B2* | 8/2015 | Rhoads | H04W 4/001 |
| 9,160,984 | B2* | 10/2015 | Pacor | H04N 21/21805 |
| 9,210,477 | B2* | 12/2015 | Pacor | H04N 21/63 |
| 2010/0174813 | A1 | 7/2010 | Hildreth et al. | |
| 2010/0235886 | A1 | 9/2010 | Muller et al. | |
| 2011/0179125 | A1 | 7/2011 | Lee et al. | |
| 2015/0193684 | A1* | 7/2015 | Li | G06F 17/30964 706/55 |
| 2015/0350363 | A1* | 12/2015 | Li | H04L 67/2838 709/223 |

FOREIGN PATENT DOCUMENTS

| | | |
|---|---|---|
| CN | 102393843 A | 3/2012 |
| WO | 2012109786 A1 | 8/2012 |

OTHER PUBLICATIONS

Adaptive Model Update Algorithms for Remote Network Emulation Yan Gu; Fujimoto, R. Principles of Advanced and Distributed Simulation, 2008. PADS '08. 22nd Workshop on Year: 2008 pp. 15-22, DOI: 10.1109/PADS.2008.26 Referenced in: IEEE Conference Publications.*

Game Theoretic Aspects of the Multi-Channel Aloha Protocol in Cognitive Radio Networks Cohen, K.; Leshem, A.; Zehavi, E. Selected Areas in Communications, IEEE Journal on Year: 2013, vol. 31, Issue: 11 pp. 2276-2288, DOI: 10.1109/JSAC.2013.131109 Referenced in: IEEE Journals & Magazines.*

An experimental investigation into the influence of user state and environment on fading characteristics in wireless body area networks at 2.45 GHz Cotton, S.L.; Scanlon, W.G. Wireless Communications, IEEE Transactions on Year: 2009, vol. 8, Issue: 1 pp. 6-12, DOI: 10.1109/T-WC.2009.070788 Referenced in: IEEE Journals & Magazines.*

The Application of Users' Collective Experience for Crafting Suitable Search Engine Query Recommendations Ensan, F.; Bagheri, E.; Kahani, M. Communication Networks and Services Research, 2007. CNSR '07. Fifth Annual Conference on Year: 2007 pp. 148-156, DOI: 10.1109/CNSR.2007.63 IEEE Conference Publications.*

Application of signal processing and neural network for transient waveform recognition in power system Shanlin Kang; Huanzhen Zhang; Yuzhe Kang Control and Decision Conference (CCDC), 2010 Chinese Year: 2010 pp. 2481-2484, DOI: 10.1109/CCDC.2010. 5498788 IEEE Conference Publications.*

A User-Relationship-Based Cache Replacement Strategy for Mobile Social Network Qiyuan Xing; Yue Li; Jing Wang; Yanbo Han Frontier of Computer Science and Technology (FCST), 2015 Ninth International Conference on Year: 2015 pp. 376-381, DOI: 10.1109/FCST. 2015.54 IEEE Conference Publications.*

OFDMA nonlinear distortion recovery using improved clipping localization and iterative projections Guoguang Chen; Ansari, R. Wireless Telecommunications Symposium (WTS), 2013 Year: 2013 pp. 1-5, DOI: 10.1109/WTS.2013.6566249 IEEE Conference Publications.*

Berman F., "From TeraGrid to Knowledge Grid," Communications of the ACM, vol. 44, No. 11, pp. 27-28, ACM (2001).

Boyd, D.M., and Ellison, N.B., "Social Network Sites: Definition, History, and Scholarship," Journal of Computer Mediated Communication, vol. 13, Issue 1, pp. 210-230, International Communication Association (2007).

Cañas, A.J., et al., "Using WordNet for Word Sense Disambiguation to Support Concept Map Construction," In Proceedings of SPIRE 2003. 10th International Symposium on String Processing and Information, pp. 11, Springer-Verlag (2003).

Feng, H., "Talking user classification," CDC, accessed at http://web.archive.org/web/20121112161843/http://cdc.tencent.com/?p=1588, Sep. 22, 2009, pp. 1-2.

Jung, J.J and Euzenat, J., "Towards semantic social networks," Lecture Notes in Computer Science, vol. 4519, pp. 267-280 (2007).

Kate, R.J., et al., "Learning to Transform Natural to Formal Languages," Proceedings of the Twentieth National Conference on Artificial Intelligence (AAAI-05), pp. 1062-1068 (Jul. 2005).

Kaya, A., and Selzer, K., "Design and Implementation of a Benchmark Testing Infrastructure for the DL System Racer," Proceedings of the KI-2004 International Workshop on Applications of Description Logics (ADL'04), pp. 1-10 (2004).

International Search Report with Written Opinion for International Application No. PCT/CN2012/084878 mailed on Aug. 22, 2013.

* cited by examiner

DEGREE OF CLOSENESS BASED ON COMMUNICATION CONTENTS

CROSS-REFERENCE TO RELATED APPLICATION

This application is the national stage filing under 35 U.S.C. §371 of PCT application Ser. No. PCT/CN12/084878, filed on Nov. 20, 2012. The disclosure of the PCT application is hereby incorporated herein by reference in its entirety.

TECHNICAL FIELD

The embodiments described herein pertain generally to analyzing a user's online communications with other people and/or entities to calculate a respective degree of closeness based on, at least, multi-dimensional ontological reasoning.

BACKGROUND

As subscribers utilize cloud-based services in increasingly more aspects of their daily lives, filtering of such services or other communications is needed in order to keep the volume of communications on a manageable scale. With cloud-based social networks, for example, categorization of relationships between a respective subscriber and others may be one such criterion for such filtering purposes. However, the relationships identified for such services may be categorized based on broadly-defined user designations, and therefore may not reflect the true nature of the respective relationships. Thus, the services and other communications may lack the efficiency and even accuracy that initially attract subscribers to the respective services.

SUMMARY

In one example embodiment, a method may include monitoring contents of communications between a first user and a second user, determining a degree of closeness between the first user and the second user utilizing an ontological model, with the degree of closeness being based at least in part on the contents of communications between the first user and the second user, and updating the degree of closeness based at least in part on a frequency of communications between the first user and the second user.

In another example embodiment, a computer-readable medium may store instructions that, when executed, cause one or more processors to perform operations that include establishing an ontological model that indicates a degree of closeness between a first user and a second user, analyzing a content of a first communication between the first user and the second user, determining a degree of closeness between the first user and the second user using the ontological model and a result of the analysis, and decaying the degree of closeness between the first user and the second user until an occurrence of a second communication between the first user and the second user.

In yet another example embodiment, a system may comprise a first component that is configured to determine a degree of closeness between a first user and a second user utilizing an ontological model, with the degree of closeness being based at least in part on contents of communications between the first user and the second user, and a second component that is configured to update the degree of closeness based on a pattern of communications between the first user and the second user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
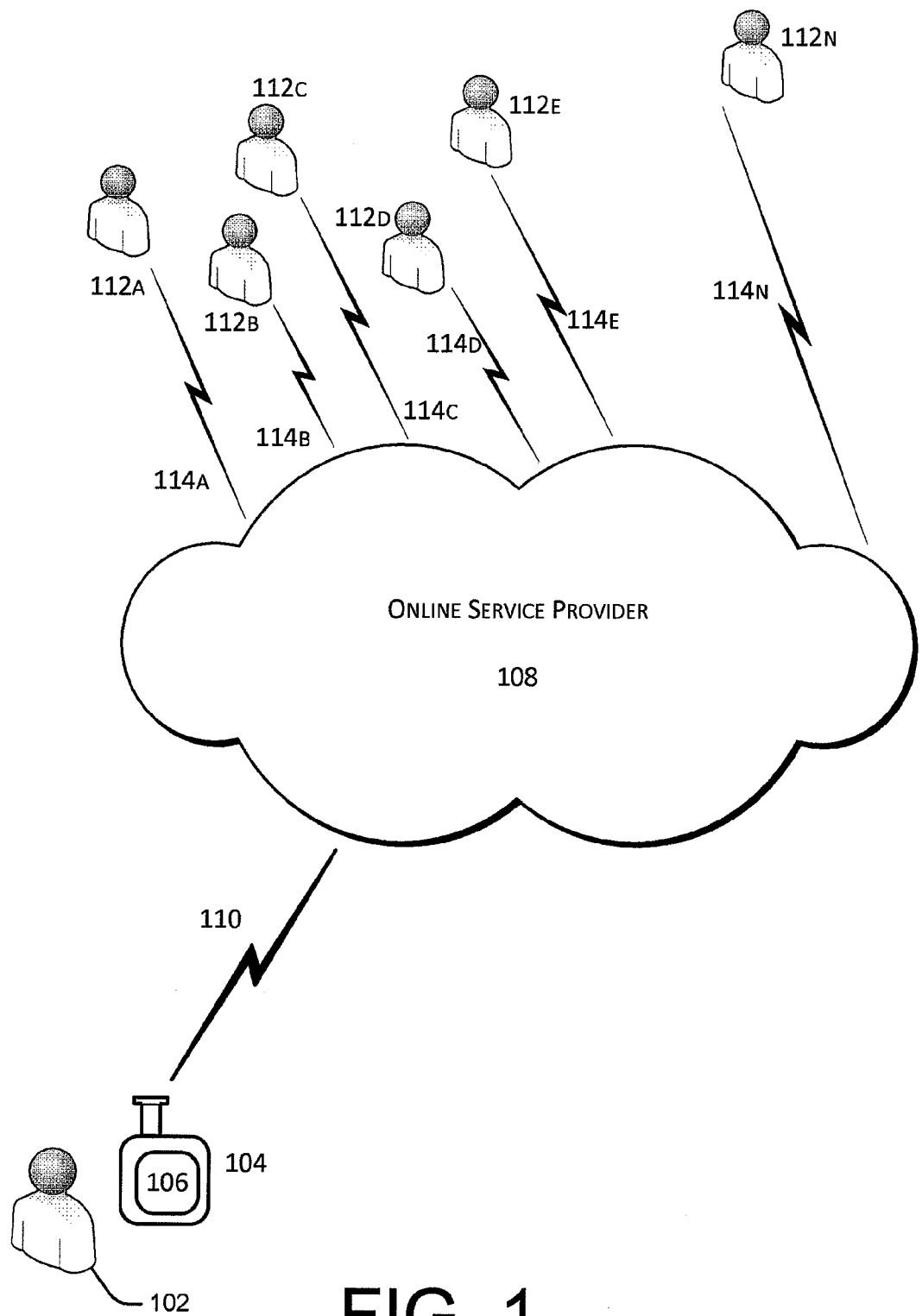
FIG. 1 shows an example system configuration by which degrees of closeness based on communication contents may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

As referenced throughout the present description, an "ontological model" may refer to a schema for representing people and/or entities that are identified or otherwise documented with an online service provider as having a relationship with a subscriber to at least one cloud-based service. An ontological model may include a set of representational terms that associate names of people and/or entities that have a relationship with the subscriber, and axioms may be further provided to constrain an interpretation and use of the descriptions. Thus, an ontological model may be regarded as a statement of a logical theory, and an axiom may define a relationship between two concepts with respect to the subscriber in the ontological model.

FIG. 1 shows an example system configuration 100 by which degrees of closeness based on communication contents may be implemented, arranged in accordance with at least some embodiments described herein. As depicted, configuration 100 includes, at least, a client device 104 with an instance of a client application 106 hosted thereon, and an online service provider 108. A user 102, who may alternately be referred to as a subscriber, may be regarded as a person or entity that exercises ownership or control of client device 104. People and/or entities 112A-112N may be regarded as people or entities with whom user 102 has a relationship that is registered or documented with the online service provider 108. Non-limiting examples of entities that may be represented by user 102 or entities 112A-112N may include one or more organizations (e.g., corporation, university, charity, etc.) on behalf of which an online relationship may be established and maintained by a moderator, webmaster, etc, who conduct online activity on behalf of the respective entity. Such examples are not intended to be limiting in any manner, including as pertaining to a number of people and/or entities depicted, and therefore should not be interpreted to be so. Still, example embodiments described herein are likely to pertain to relationships that are established between people; and therefore, unless a distinction of people/entities 112A-112N is needed to enhance the description for degrees of closeness based on communication contents, general references may be made herein to "people 112."

Client device 104 may refer to a processor-based electronic device on which an instance of client application 106 may be hosted to determine degrees of closeness based on communication contents. Further, client device 104 may be configured to transmit and receive data over a link to service provider 108 by further connecting to a mobile communications network provided by a wireless service provider (not shown). Client device 104 may be implemented as a mobile (or portable) electronic device such as a mobile phone, cell phone, smartphone, personal data assistant (PDA), a personal media player device, an application specific device, or a hybrid device that includes any of the above functions. Client device 104 may also be implemented as a personal computer including tablet, laptop computer, and non-laptop computer configurations, which may be connected to the aforementioned mobile communications network or, alternatively, to a wired network.

The aforementioned wireless service provider for implementing communications for client device 104 may also be known as a mobile network carrier, wireless carrier, or even cellular company. Regardless of the alternate reference, the wireless service provider may provide services for mobile communications subscribers. Client device 104 may be configured to communicate with online service provider 108 or any of people 112, some or all of whom may similarly communicate with each other. Further, client device 104 may be configured to communicate with any of people 112 directly in a peer-to-peer networking environment.

Client application 106 may refer to a program implemented by hardware, software, firmware, or any combination thereof that may be utilized to determine degrees of closeness based on communication contents. Client application 106 may be included in or otherwise integrated with transactional software (not shown). That is, client application 106 hosted on client device 104 may enable client device 104 to engage with online service provider 108 or, alternatively, any of people 112. Client application 106 may facilitate user interaction with at least online service provider 108 and/or any of people 112. Further, at least some embodiments for determining degrees of closeness based on communication contents may contemplate client application 106 representing a web browser that is configured to facilitate user interaction with at least online service provider 108 and/or any of people/entities 112. Further still, client application 106, or a modified version thereof, may be hosted on a client device corresponding to any of people 112, as well, in order to determine degrees of closeness based on communication contents for a respective one of people 112.

Online service provider 108 may be regarded as a cloud-based service and storage platform that may be owned and/or operated by a third-party service provider. Online service provider 108 may include a framework of hardware, software, firmware, or any combination thereof, through which or to which digital data and information may be stored, passed, or shared with regard to a transaction for which at least one subscriber to the hosted service, including client device 104, is a party. By way of example, online service provider 108 may be implemented as a social networking service to which user 102 and people 112 register prior to use. Non-limiting examples of online service provider 108 may include Facebook®, Google+®, Twitter®, LinkedIn®, Yammer®, etc.

Communication link 110 may refer to a communication link enabled by a protocol utilized to transmit data and/or information between client application 106, via client device 104, and online service provider 108.

Communication links 114A-114N may refer to communication links enabled by a protocol utilized to facilitate communication between client device 104 under the ownership or control of user 102, via online service provider 108, and a client device that is owned or controlled by any one of people 112, respectively.

The aforementioned protocols referring to communication links 110 and 114A-114N may include any mobile communications technology, e.g., GSM (Global System for Mobile Communications), CDMA (Code Division Multiple Access), etc., depending upon the technologies supported by particular wireless service providers to whose services client device 104, online service provider 108, and people 112 may be assigned or subscribed. Further, one or more of the aforementioned communication links 110 and 114A-114N may be implemented utilizing non-cellular technologies such as conventional analog AM or FM radio, Wi-Fi™, WLAN (wireless local area network) or IEEE 802.11 (Institute of Electrical and Electronics Engineers), WiMAX™ (Worldwide Interoperability for Microwave Access), Bluetooth™, hard-wired connections, e.g., cable, phone lines, and other analog and digital wireless voice and data transmission technologies.

Thus, FIG. 1 shows an example implementation of a system configuration for determining degrees of closeness based on communication contents.

Figure 2:
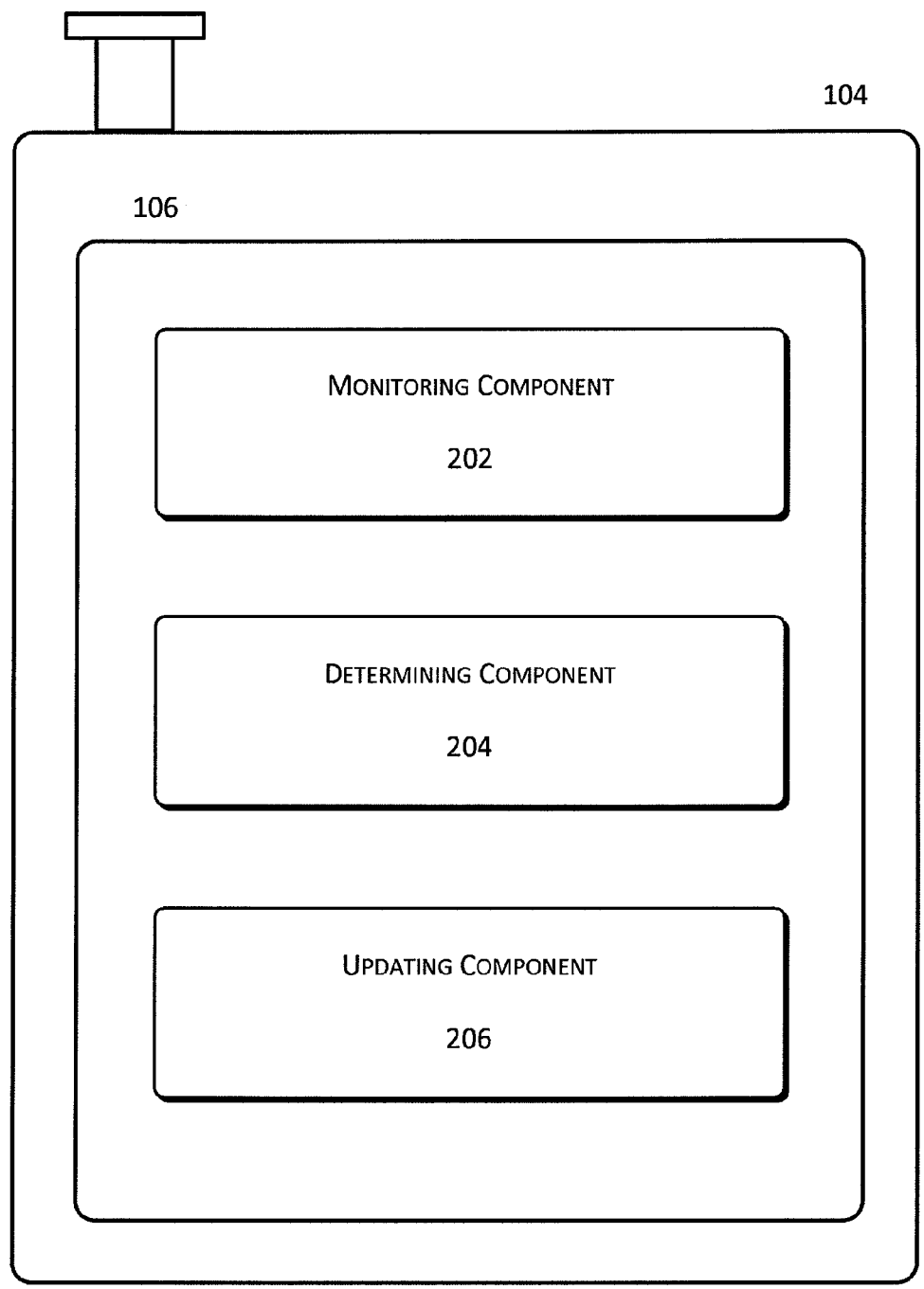
FIG. 2 shows an example client device on which degrees of closeness based on communication contents may be implemented, arranged in accordance with at least some embodiments described herein.

FIG. 2 shows an example client device 104 on which degrees of closeness based on communication contents may be implemented, arranged in accordance with at least some embodiments described herein. As depicted, example configuration 200 of client application 106, hosted on client device 104, may include a monitoring component 202, a determining component 204, and an updating component 206.

Client application 106 may refer to a program implemented by hardware, software, firmware, or any combination thereof that may be utilized to determine degrees of closeness based on communication contents. To that end, client application 106 may be included in or otherwise integrated with transactional software (not shown). That is, client application 106 hosted on client device 104 may enable client device 104 to engage with online service provider 108 or, alternatively, any of people 112. Client application 106 may facilitate user interaction with at least online service provider 108 and/or any of people 112. Further, at least some embodiments for determining degrees of closeness based on communication contents may contemplate client application 106 representing a web browser that is configured to facilitate user interaction with at least online service provider 108 and/or any of people 112. Further still, client application 106, or a modified version thereof, may be hosted on a client device owned or controlled by any of people 112, as well, in order to determine degrees of closeness based on communication contents for a respective one of people 112.

Monitoring component 202 may refer to a component or module of client application 106 that is designed, programmed, or configured to monitor contents of any communications between user 102 and people 112 within a designated period of time.

Monitoring component 202 may monitor contents of communications involving user 102, within the designated period of time, by scanning text transmissions that user 102 transmits and receives via client application 106, by transcribing conversations that user 102 conducts via client application 106, and/or by transcribing audio files that are played on client device 104 after having been transmitted or received via client application 106. Monitoring component 202 may therefore utilize known mechanisms, programs, and/or techniques to facilitate such scanning and transcription.

Determining component 204 may refer to a component or module of client application 106 that is designed, programmed, or configured to determine a degree of closeness between user 102 and those of people 112 with whom user 102 has communicated within the designated period of time, and of which the communications have been monitored by monitoring component 202. Determining component 204 may determine the respective degrees of closeness between user 102 and respective ones of people 112 by mapping the contents of the respective monitored communications onto an ontological model for user 102.

An ontological model that may be utilized to determine a degree of closeness between user 102 and one or more of people 112 may be one or more private ontologies defined and hosted on client device 104. The private ontologies for user 102 may be defined by or on behalf of user 102, or the private ontologies for user 102 may be imported onto client device 104 from an external source. Subsequent references to the ontological model utilized on client device 104, for user 102, may include "private ontologies" and/or "private ontological model."

Alternative embodiments of degrees of closeness may contemplate the one or more private ontologies being defined and/or hosted by service provider 108, and such embodiments may be similarly implemented as described herein. However, prudence and privacy interests may render it preferable to keep the embodiments on the client device.

The private ontologies for user 102 may include nodes and axioms. Nodes may refer to concepts that define relationship concepts for user 102. Non-limiting examples of nodes for the private ontologies for user 102 may include "personal information," "family information," "career information," "education information," "spouse," "child," "sibling," "friend," "significant other," "boss," "colleague," "direct report," "client," "classmate," "teacher," "student," etc. The private ontologies may include a combination of such example node headings or titles in addition to nodes with headings or titles that include specific names. Sample headings or titles of such nodes may include, but in no way to be limited to, names of individuals, names of companies, names of schools and/or universities, etc. Further, the ontological model for user 102 may include multiple private ontologies, each pertaining to a particular relational "dimension" for user 102, such as non-limiting examples "family relationships," "personal relationships," and/or "professional relationships." Axioms may be understood to define a relationship between two nodes of the private ontologies for user 102.

Determining component 204 may therefore be designed, programmed, or configured to map the scanned and/or transcribed contents of communications involving user 102 and one or more of people 112 onto the private ontologies for user 102. Unless a distinction is necessary for the present description, the scanned and/or transcribed communications involving user 102 and one or more of people 112 may be collectively referenced as "communications."

Determining component 204 may analyze the scanned or transcribed communications between user 102 and any one of people 112 by dividing or segmenting the scanned or transcribed communication contents into sentences, and further determine whether one or more words in each of the respective sentences connect two linked nodes in the private ontologies. Any such affirmatively determined words may be mapped onto the private ontologies.

To implement the mapping, determining component 204 may determine whether or not information conveyed in each mapped sentence is deducible from the private ontologies or is inconsistent with the private ontologies. To do so, determining component 204 may identify a set of a minimal number of relational axioms, defining a relationship between two nodes, from the relational axioms in the private ontologies that may satisfy a justification for deducibility. A respective value of contribution to a degree of closeness in each of a multiple number of dimensions of relationship for user 102 may be calculated for the set of minimal number of relational axioms. However, if there are no words in a sentence from any of the respective communications that may be affirmatively determined to connect any of the nodes in the private ontologies, the words may be deemed to be irrelevant.

If it is determined that the information conveyed in a respective mapped sentence from a communication between user 102 and a particular one of people 112 is deducible from the private ontologies, the degree of closeness between user 102 and the particular one of people 112 may be increased by a predefined increment. However, if it is determined that the information conveyed in the respective mapped sentence is not deducible from the private ontologies, the degree of closeness between user 102 and the particular one of people 112 may decrease by the predefined increment. Subsequently, the values of contribution to a degree of closeness associated with the set of minimal number of relational axioms in the multiple number of dimensions of relationship for user 102 may be compiled, or summed, to thus determine a degree of closeness between user 102 and a respective one of people 112.

Updating component 206 may refer to a component or module of client application 106 that is designed, programmed, or configured to update the respective degrees of closeness between user 102 and respective ones of people 112 based at least in part on a frequency of communications between user 102 and respective ones of people 112 within the designated period of time.

In accordance with at least one example embodiment, updating component 206 may update the compiled or summed values of contribution to the degree of closeness associated with the set of minimal number of relational axioms with a frequency and an amount of elapsed time between user 102 and respective ones of people 112. The updating may include degrading, or decaying, a determined degree of closeness between user 102 and a respective one of people 112 if there is no communication therebetween during the predetermined period of time or until a next communication therebetween occurs. In the latter scenario, the determined degree of closeness between user 102 and a respective one of people 112 may automatically be implemented upon completion of each communication therebetween. For example, to calculate the degree of closeness between two friends, Tom and Jerry, the predetermined period of time may be set to be one month. If the two friends have not communicated with each other for that period of time, the updating may degrade or decay the degree of closeness between Tom and Jerry. Alternatively, without setting a predetermined period of time, the determined degree of closeness may be calculated and updated upon Tom and Jerry's next communication. In this example, the length of the time period since Tom and Jerry's last communication may be taken into consideration for calculating the degree of closeness.

Thus, FIG. 2 shows an example configuration of service provider 108 by which one or more embodiments of transactional permissions may be implemented.

Figure 3:
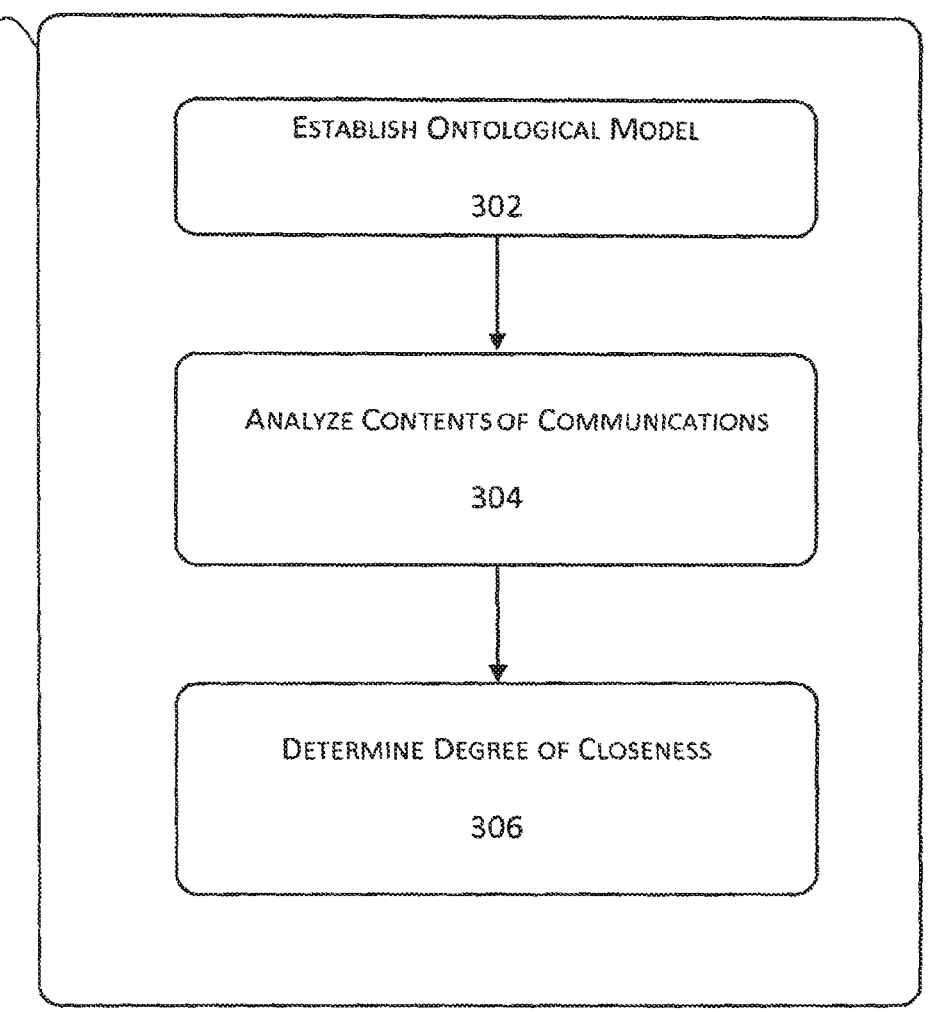
FIG. 3 shows an example processing flow of operations that may be processed by a determining component that may be included in an application for determining degrees of closeness based on communication contents, arranged in accordance with at least some embodiments described herein.

FIG. 3 shows an example processing flow 300 of operations that may be processed by a determining component that may be included in an application for determining degrees of closeness based on communication contents, arranged in accordance with at least some embodiments described herein. As depicted, processing flow 300 includes sub-processes that may be executed by various components of determining component 204, as described above with reference to the example client application 106. However, processing flow 300 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 302, 304, and/or 306. Processing may begin at block 302.

Block 302 (Establish Ontological Model) may refer to private ontologies for user 102 being defined on client device 104 utilizing a user interface that may or may not be incorporated into client application 106. The private ontologies for user 102 may be defined by or on behalf of user 102, or the private ontologies for user 102 may be imported onto client device 104 from an external source. As set forth above, the private ontologies for user 102 may include nodes and axioms. Nodes may refer to concepts that define relationship concepts for user 102 and axioms may be understood to define a relationship between two nodes of the private ontologies for user 102. Processing may proceed from block 302 to block 304.

Block 304 (Analyze Contents of Communications) may refer to determining component 204 analyzing the scanned or transcribed communications between user 102 and respective ones of people 112. The analysis may include dividing or segmenting the scanned or transcribed words into sentences, and further determining whether one or more of words in each of the respective sentences connect two linked nodes in the private ontologies. Any such affirmatively determined words may be mapped onto the private ontologies in order for the respective degrees of closeness between user 102 and the respective ones of people 112 to be determined.

The aforementioned analysis at block 304 may include determining whether or not information conveyed in each mapped sentence is deducible from the private ontologies or is inconsistent with the private ontologies. To do so, determining component 204 may identify a set of a minimal number of relational axioms from the relational axioms in each of the private ontologies that may satisfy a justification for deducibility. A respective value of contribution to a degree of closeness in each of a multiple number of dimensions of relationship for user 102 may be calculated for the set of minimal number of relational axioms. However, if there are no words in a sentence from any of the respective communications that may be affirmatively determined to connect any of the nodes in the respective private ontologies, the words may be deemed to be irrelevant. Processing may proceed from block 304 to block 306.

Block 306 (Determine Degree of Closeness) may refer to determining component determining a degree of closeness between user 102 and respective ones of people 112. If the analysis at block 304 reveals that information conveyed in a respective mapped sentence is deducible from one of the private ontologies, a point may be added for calculating the degree of closeness between user 102 and a respective one of people 112, of which the mapped sentence is included in a corresponding communication. If the analysis at block 304 reveals that the information conveyed in the respective mapped sentence is not deducible from one of the private ontologies, a point may be subtracted for calculating the degree of closeness between user 102 and the particular one of people 112. Subsequently, the values of contribution to a degree of closeness associated with the set of minimal number of relational axioms in the multiple number of dimensions of relationship for user 102 may be compiled, or summed, to thus determine a degree of closeness between user 102 and a respective one of people 112.

Thus, FIG. 3 shows an example processing flow 300 by which degrees of closeness based on communication contents may be determined.

Figure 4:
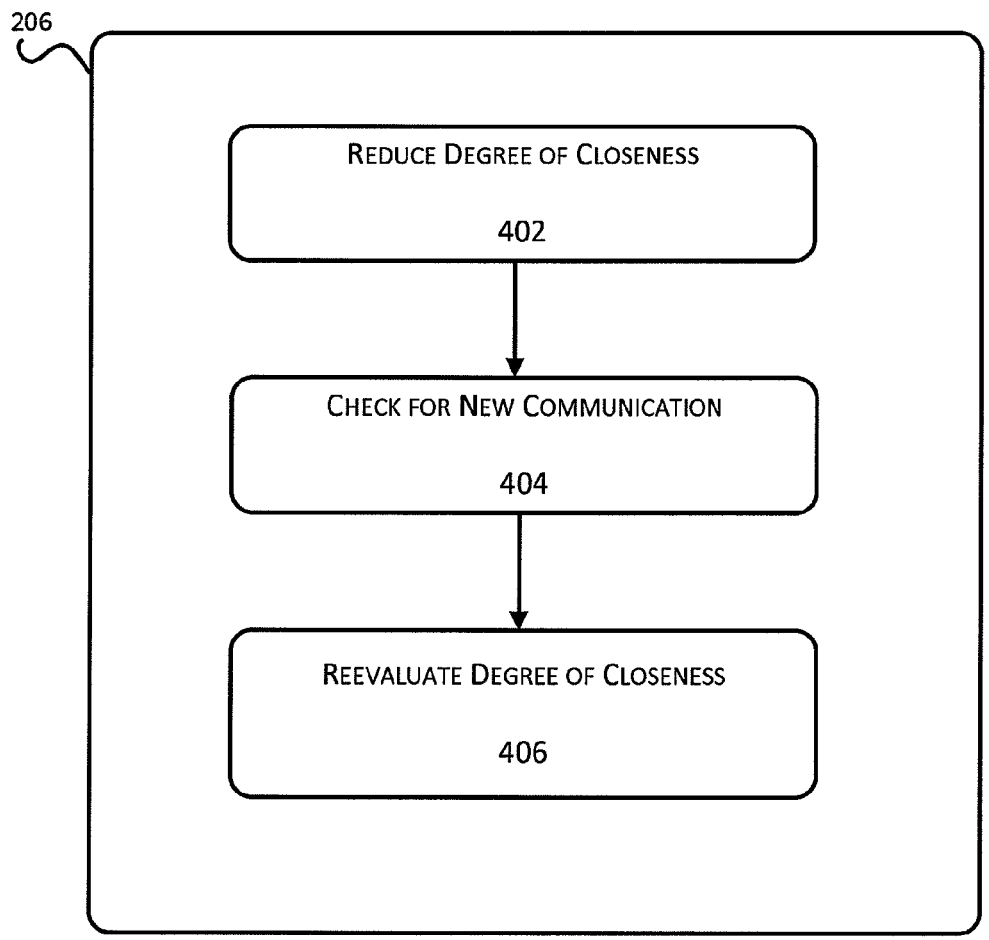
FIG. 4 shows an example processing flow of operations that may be processed by an updating component that may be included in an application for determining degrees of closeness based on communication contents, arranged in accordance with at least some embodiments described herein.

FIG. 4 shows an example processing flow 400 of operations that may be processed by an updating component that may be included in an application for determining degrees of closeness based on communication contents, arranged in accordance with at least some embodiments described herein. As depicted, processing flow 400 includes sub-processes that may be executed by various components of updating component 206, as described above with reference to the example client application 106. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, and/or 406. Processing may begin at block 402.

Block 402 (Reduce Degree of Closeness) may refer to updating component 206 automatically degrading, or decaying, a determined degree of closeness between user 102 and a respective one of people 112 upon the passage of a predetermined period of time. The degradation, or decaying, may be implemented by at least one incremental degree, e.g., a point, upon the passage of each predetermined period of time. For example, as to the two friends, Tom and Jerry, the determined degree closeness may be one hundred points and the predetermined period of time may be set as one month. One point may be deducted from the initial one hundred points upon the passage of every one month. Thus, in keeping with the example, when Tom and Jerry have not communicated with each other for nine months, the degree of closeness of Tom and Jerry may be calculated to be ninety one points indicating that they are not as close as before.

Block 404 (Check for New Communication) may refer to updating component 206 determining whether another communication has occurred between user 102 and the respective one of people 112 within the predetermined period of time. If another such communication is determined to have not occurred, processing may proceed from decision block 404 back to block 402. If another such communication is determined to have occurred, processing may proceed from decision block 404 to block 406.

Block 406 (Reevaluate Degree of Closeness) may refer to updating component 206 determining that another communication has occurred between user 102 and the respective one of people 112 within the predetermined period of time, and therefore the degradation/decaying of the degree of closeness therebetween may cease, at least temporarily. Determining component 204 may analyze the scanned or transcribed communication between user 102 and the respective one of people 112 and further calculate the value of the contribution of this communication to the degree of closeness. Upon the completion of the communication, updating component 206 may then update the degree of closeness, where the degree of closeness may increase or decrease depending on the result of determining component 204. In the case that unexpected details regarding user 102 appear in the recent communication, the degree of closeness may increase upon the completion of the communication after a predetermined period of time. Since monitoring component 202 may not include all information with regard to user 102, it may be possible other communications have occurred outside the monitored communication contents. For example, when, according to the monitoring component 202, Tom and Jerry have not talked to each other for months, however, in the most recent communication, Jerry said "Tom, the turkey you made last week was amazing, come to my house for Thanksgiving next year." The unexpected detail indicating that they spent Thanksgiving together may increase the degree of closeness between Tom and Jerry even when it appears on the monitored record they have not contacted each other for months.

Thus, FIG. 4 shows an example processing flow 400 by which degrees of closeness based on communication contents may be updated.

Figure 5A:
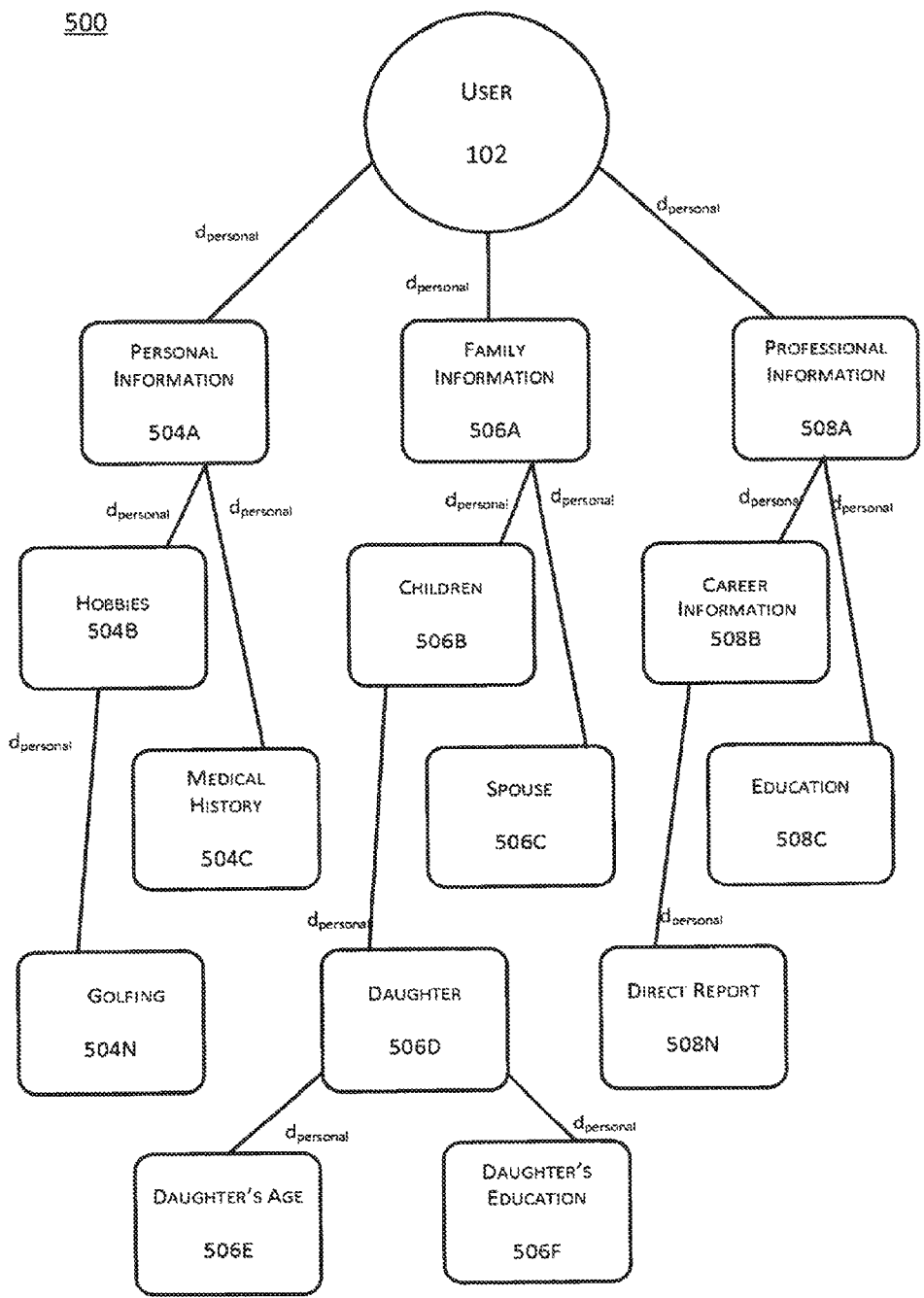
FIGS. 5A and 5B show example ontologies for sample dimensions of a user's relationships by which degrees of closeness based on communication contents may be implemented, in accordance with at least some embodiments described herein.
Figure 5B:
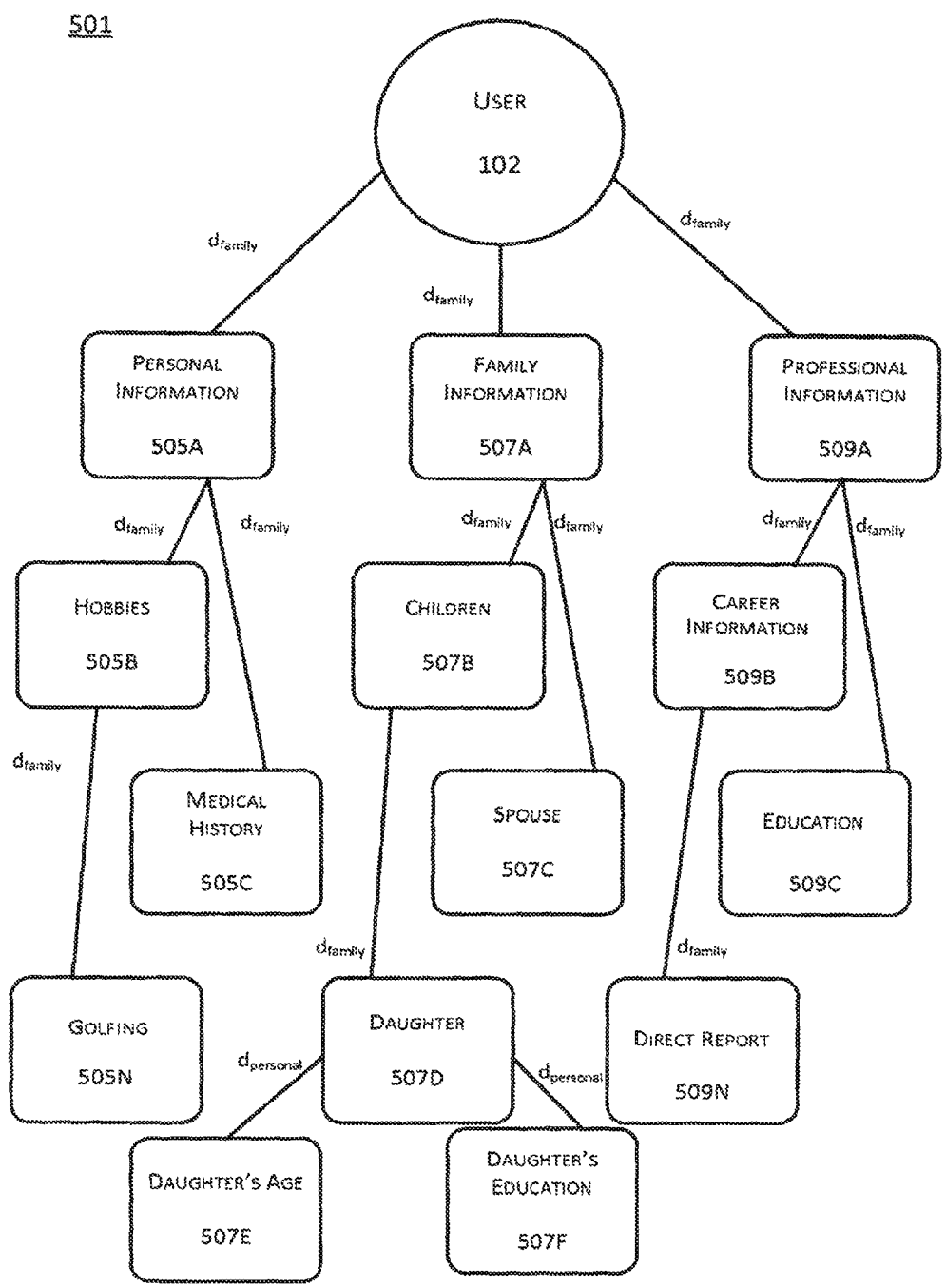

FIGS. 5A and 5B show example ontologies 500 and 501, respectively, for sample dimensions of a user's relationships by which degrees of closeness based on communication contents may be implemented, in accordance with at least some embodiments described herein.

FIG. 5A shows a private ontology 500 created for the personal dimension of relationships for user 102. Such dimension may be determined by the relationship between user 102 and one or more of people 112.

As depicted, a private ontology for user 102 may include nodes and axioms. Nodes may refer to concepts that define relationship concepts for user 102. Non-limiting examples of nodes for the private ontology for user 102 may include "personal information," "family information," "career information," "education information," "spouse," "child," "sibling," "friend," "significant other," "boss," "colleague," "direct report," "client," "classmate," "teacher," "student," etc. As depicted, "personal information" 504A may include "hobbies" 504B, "medical history" 504C, and "golfing" 504N; "family information" 506A may include "children" 506B, "spouse" 506C, "daughter" 506D, "daughter's age" 506E, and "daughter's education" 506F; and "professional information" 508A may include "career information" 508B, "education" 508C and "direct report" 508N, which are placed on the nodes of the ontology 500.

Each axiom may be assigned a private degree marked as "$d_{personal}$" in private ontology 500. The private ontology may include a combination of such example node headings or titles in addition to nodes with headings or titles that include specific names. Sample headings or titles of such nodes may include, but in way be limited to, names of individuals, names of companies, names of schools and/or universities, etc. Each scanned or transcribed communications between user 102 and a respective one of people 112, after being divided or segmented, may be placed along a combination of certain nodes and axioms. For instance, when the conversation contents between user 102 and a friend includes an example sentence such as, "Tom, how is your daughter doing in kindergarten," the sentence may be first divided or segmented into a series of meaningful words including "Tom's daughter," "daughter in kindergarten." Such segments may be mapped on private ontology 500. For example, the segments may be mapped to "family information" 506A, "children" 506B, "daughter" 506D, "daughter's age" 506E, and "daughter's education" 506F. As depicted in private ontology 500, a sentence providing such information may be mapped on a longer branch having more axioms and nodes than another sentence simply containing the information that user 102 has children, e.g., "Tom, how many kids do you have?". Such sentence, thus, further indicates a higher degree of closeness with user 102 than the latter.

Axioms may be understood to define a relationship between two nodes of the private ontologies for user 102, and each axiom may be assigned a private degree in determining the closeness value of a given piece of the scanned or transcribed communications. At least in one embodiment, the private degree for each axiom may be determined by the parameters including maximum distance in the ontology, a pre-selected number of key nodes from a pre-determined corpus, and the pre-selected number. A pre-determined corpus may be based on semantics study or existing database.

With regard to a respective one of people 112, the private degree may be calculated in one or more dimensions since a same piece of information included in communication contents may represent a different private degree in different dimensions, i.e., when communicating with people within a different relationship dimension. For instance, when user 102 is communicating with a colleague, a private ontology may be created for the professional dimension of relationships for user 102, for which the private degrees are to be calculated accordingly. However, if user 102 is communicating with a cousin, the private degree may be determined based on the ontology created in family dimension of relationships for user 102. Further, if a professional colleague of user 102 is also a family member, e.g., cousin, the private ontologies for determining the private degree based on one piece of the communication may be created in both personal and professional dimensions for user 102 because, for example, when a conversation therebetween includes a mentions of a childhood nickname for user 102, which may increase the private degree of the relationship in the private ontologies for the professional dimension but decrease the degree of relationship in the private ontology for the family dimension.

Thus, FIG. 5A shows a private ontology created in personal dimension by which an example of degrees of closeness based on communication contents may be implemented.

FIG. 5B shows an ontology created in family dimension 501, as the result of establishing the ontological model at block 302 (FIG. 3), by which an example of degrees of closeness based on communication contents may be implemented, in accordance with at least some embodiments described herein. Such dimension may be determined by the relationship between user 102 and one or more of people 112. In this example, the ontology created in family dimension 501 may be applied to communications between user 102 and a family member among people 112.

As depicted, similar to FIG. 5A, a private ontology for user 102 may include nodes and axioms. Nodes may refer to concepts that define relationship concepts for user 102. Non-limiting examples of nodes for the private ontologies for user 102 may include "personal information," "family information," "career information," "education information," "spouse," "child," "sibling," "friend," "significant other," "boss," "colleague," "direct report," "client," "classmate," "teacher," "student," etc. As depicted, "personal information" 505A may include "hobbies" 505B, "medical history" 505C, and "golfing" 505N; "family information" 507A may include "children" 507B, "spouse" 507C, "daughter" 507D, "daughter's age" 507E, and "daughter's education" 507F; and "professional information" 509A may include "career information" 509B, "education" 509C and "direct report" 509N, as nodes for private ontology 501.

Each axiom may be assigned a private degree marked as "$d_{family}$," in the ontology 501. Private ontology 501 may include a combination of such example node headings or titles in addition to nodes with headings or titles that include specific names. Sample headings or titles of such nodes may include, but in way be limited to, names of individuals, names of companies, names of schools and/or universities, etc. Each scanned or transcribed communications between user 102 and a respective one of people 112, after being divided or segmented, may be placed along a combination of certain nodes and axioms. With the same example given in the description of FIG. 5A, "Tom, how is your daughter doing in the kindergarten," the segments of the example may be mapped in the same way of the ontology in personal dimension. However, since private ontology 501 is created for family dimension of relationships for user 102, the result of private degree calculation may vary since the information that Tom's daughter is in kindergarten may be generally known to Tom's family member and, thus, indicates less closeness value.

Axioms may be understood to define a relationship between two nodes of the private ontologies for user 102, each axiom being assigned a private degree in determining the closeness value of a given piece of the scanned or transcribed communications. In at least one embodiment, the private degree for each axiom may be determined by the parameters including maximum distance in the ontology, a pre-selected number of key nodes from a pre-determined corpus, and the pre-selected number. A pre-determined corpus may be based on semantics study or existing database. At least in one embodiment, once the ontology in a certain dimension is created, the calculation process of private degree may be similar to the process in other dimension. Notably, the specific algorithm may vary from dimension to dimension.

Thus, FIG. 5B shows a private ontology created for the family dimension of relationships for user 102, by which an example of degrees of closeness based on communication contents may be implemented.

Figure 6:
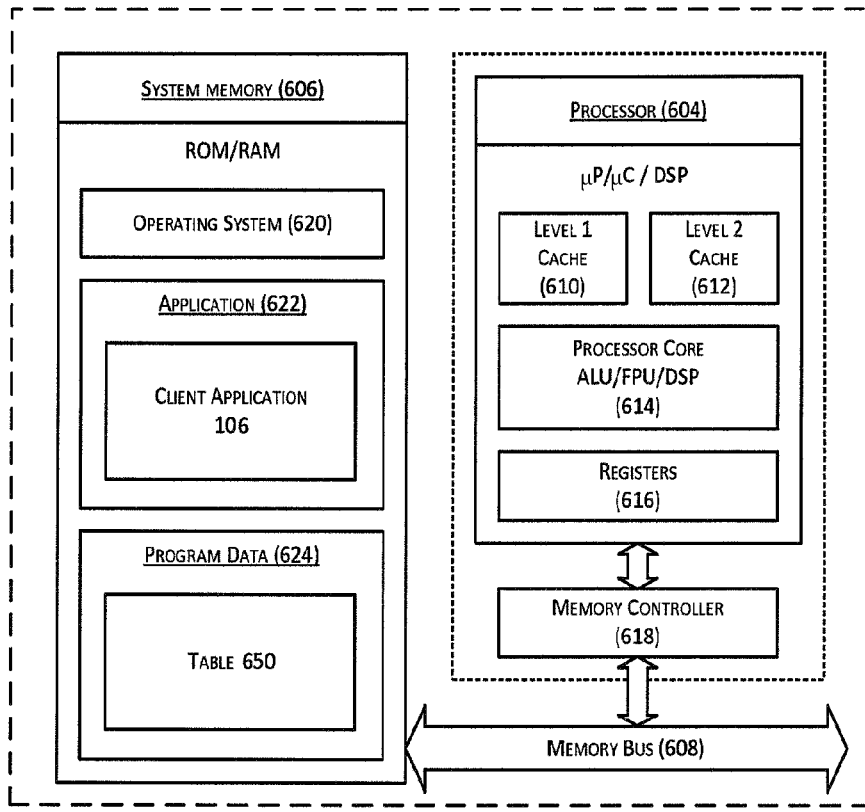
FIG. 6 shows a block diagram illustrating an example computing device by which various example solutions described herein may be implemented, arranged in accordance with at least some embodiments described herein.

FIG. 6 shows a block diagram illustrating an example computing device by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. The processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may be configured to transmit or receive identification information pertaining to client device 104 or people 112, verify or validate such identifying data, and transmit data as described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method, comprising:
    monitoring contents of communications between a first user and a second user;
    determining a degree of closeness between the first user and the second user utilizing an ontological model, the degree of closeness being based at least in part on the contents of communications between the first user and the second user; and
    updating the degree of closeness based at least in part on a frequency of communications between the first user and the second user.

2. The method of claim 1, wherein the determining a degree of closeness between the first user and the second user utilizing an ontological model comprises:
    establishing the ontological model;
    analyzing a content of a first communication between the first user and the second user; and
    determining a degree of closeness between the first user and the second user using the ontological model and a result of the analyzing.

3. The method of claim 2, wherein the establishing the ontological model comprises:
    defining a plurality of nodes, each of the nodes representing a respective concept with respect to the first user;
    defining a plurality of links with each of the links connecting and defining a relational axiom between respective two of the nodes; and
    assigning, to each of the plurality of links, a private degree value for each dimension of a plurality of dimensions of relationship with respect to a relationship between respective two nodes connected by the link.

4. The method of claim 3, wherein the plurality of nodes comprise:
    a root node representing the first user,
    a plurality of key nodes, wherein each of which represents a respective relationship type and directly linked to the root node by a respective one of the links, and
    a plurality of nodes each of which directly or indirectly linked to a respective one of the key nodes.

5. The method of claim 3, wherein the assigning comprises calculating the private degree value for each of the plurality of links based on a maximal distance in the ontological model and an inverse proportional relationship between the private degree value and a distance between respective two nodes.

6. The method of claim 3, wherein the establishing the ontological model further comprises:
    assigning an initial value for the degree of closeness between the first user and the second user;
    tracking a frequency of communications between the first user and the second user over a predefined period of time;
    tracking a total amount of time of communications between the first user and the second user over the predefined period of time; and
    recording one or more special remarks that impact the degree of closeness between the first user and the second user.

7. The method of claim 2, wherein the analyzing a content of a first communication between the first user and the second user comprises:
    segmenting the content of the first communication into a plurality of sentences, each of the plurality of sentences including a set of one or more words; and
    mapping one or more of the plurality of sentences onto the ontological model.

8. The method of claim 7, wherein the mapping one or more of the plurality of sentences onto the ontological model comprises:
    determining whether one or more words in each of the plurality of sentences connects two linked nodes in the ontological model;
    mapping the one or more words in each of the plurality of sentences in response to determining that the one or more sentences in each of the plurality of sentences connects two linked nodes in the ontological model; and
    determining that a sentence is irrelevant in response to no word in the sentence is mapped to the ontological model.

9. The method of claim 7, wherein the analyzing a content of a first communication between the first user and the second user further comprises:
    determining, for each of the mapped one or more of the plurality of sentences, whether information conveyed in each mapped sentence is deducible from the ontological model, not deducible from the ontological model, or inconsistent with the ontological model; and
    identifying a set of a minimal number of relational axioms from a plurality of relational axioms of the ontological model that can satisfy justification for deducibility and inconsistency in the determining,
    wherein each of the relational axioms defines a relationship between two concepts with respect to the first user in the ontological model.

10. The method of claim 9, wherein the determining a degree of closeness between the first user and the second user using the ontological model and a result of the analyzing comprises:

increasing a calculated degree of closeness in response to determining that the information conveyed in the respective mapped sentence is deducible from the ontological model; and decreasing the calculated degree of closeness in response to determining that the information conveyed in the respective mapped sentence is not deducible from the ontological model.

11. The method of claim 9, wherein the analyzing a content of a first communication between the first user and the second user further comprises:

calculating, for the set of minimal number of relational axioms, a respective value of contribution to the degree of closeness in each dimension of a plurality of dimensions of relationship with respect to the first user.

12. The method of claim 11, wherein the determining a degree of closeness between the first user and the second user using the ontological model and a result of the analyzing comprises:

summing the values of contribution to the degree of closeness associated with the set of minimal number of relational axioms in the plurality of dimensions of relationship to provide a total closeness value.

13. The method of claim 12, wherein the summing the values of contribution to the degree of closeness comprises updating the values of contribution to the degree of closeness in each dimension of the plurality of dimensions of relationship with a frequency and a total amount of time of communications between the first user and the second user over a predefined period of time.

14. The method of claim 1, wherein the updating the degree of closeness comprises decaying the degree of closeness between the first user and the second user until an occurrence of a second communication between the first user and the second user.

15. The method of claim 14, wherein the decaying the degree of closeness between the first user and the second user until an occurrence of a second communication between the first user and the second user comprises:

automatically decaying the degree of closeness between the first user and the second user upon completion of the first communication;

detecting the occurrence of the second communication between the first user and the second user;

ceasing the decaying in response to the detecting; and increasing the degree of closeness between the first user and the second user based at least in part on the occurrence of the second communication.

16. The method of claim 15, further comprising:

automatically decaying the degree of closeness between the first user and the second user upon completion of the occurrence of the second communication.

17. A non-transitory computer-readable medium storing instructions that, when executed, cause one or more processors to perform operations comprising:

establishing an ontological model that indicates a degree of closeness between a first user and a second user;

analyzing a content of a first communication between the first user and the second user;

determining a degree of closeness between the first user and the second user using the ontological model and a result of the analyzing; and decaying the degree of closeness between the first user and the second user until an occurrence of a second communication between the first user and the second user.

18. The computer-readable medium of claim 17, wherein the establishing an ontological model comprises:

defining a plurality of nodes, each of the nodes representing a respective concept with respect to the first user;

defining a plurality of links with each of the links connecting and defining a relational axiom between respective two of the nodes; and assigning to each of the plurality of links a private degree value for each dimension of a plurality of dimensions of relationship with respect to a relationship between respective two nodes connected by the link.

19. The computer-readable medium of claim 18, wherein the plurality of nodes comprise a root node representing the first user, a plurality of key nodes each of which representing a respective relationship type and directly linked to the root node by a respective one of the links, and a plurality of nodes each of which directly or indirectly linked to a respective one of the key nodes.

20. The computer-readable medium of claim 18, wherein the assigning comprises calculating the private degree value for each of the plurality of links based on a maximal distance in the ontological model and an inverse proportional relationship between the private degree value and a distance between respective two nodes.

21. The computer-readable medium of claim 18, wherein the establishing an ontological model further comprises:

assigning an initial value for the degree of closeness between the first user and the second user;

tracking a frequency of communications between the first user and the second user over a predefined period of time;

tracking a total amount of time of communications between the first user and the second user over the predefined period of time; and recording one or more special remarks that impact the degree of closeness between the first user and the second user.

22. The computer-readable medium of claim 17, wherein the analyzing a content of a first communication between the first user and the second user comprises:

segmenting the content of the first communication into a plurality of sentences, each of the plurality of sentences including a set of one or more words; and mapping one or more of the plurality of sentences onto the ontological model.

23. The computer-readable medium of claim 22, wherein the mapping one or more of the plurality of sentences onto the ontological model comprises:

determining whether one or more words in each of the plurality of sentences connects two linked nodes in the ontological model;

mapping the one or more words in each of the plurality of sentences in response to determining that the one or more sentences in each of the plurality of sentences connects two linked nodes in the ontological model; and determining that a sentence is irrelevant in response to no word in the sentence is mapped to the ontological model.

24. The computer-readable medium of claim 22, wherein the analyzing a content of a first communication between the first user and the second user further comprises:

reasoning each of the mapped one or more of the plurality of sentences to determine whether information conveyed in each mapped sentence is deducible from the ontological model, not deducible from the ontological model, or inconsistent with the ontological model; and identifying a set of a minimal number of relational axioms from a plurality of relational axioms of the ontological model that can satisfy justification for deducibility and inconsistency in the determining, wherein each of the relational axioms defines a relationship between two concepts with respect to the first user in the ontological model.

25. A system, comprising:
a first component configured to determine a degree of closeness between a first user and a second user utilizing an ontological model, the degree of closeness being based at least in part on contents of communications between the first user and the second user; and
a second component configured to update the degree of closeness based on a pattern of communications between the first user and the second user.

26. The system of claim 25, wherein the first component is configured to determine the degree of closeness by performing operations comprising:
monitoring the contents of communications between the first user and the second user;
establishing the ontological model;
analyzing a content of a first communication between the first user and the second user; and
determining a degree of closeness between the first user and the second user using the ontological model and a result of the analyzing.

27. The system of claim 26, wherein the establishing the ontological model comprises:
defining a plurality of nodes, each of the nodes representing a respective concept with respect to the first user;
defining a plurality of links with each of the links connecting and defining a relational axiom between respective two of the nodes; and
assigning to each of the plurality of links a private degree value for each dimension of a plurality of dimensions of relationship with respect to a relationship between respective two nodes connected by the link.

28. The system of claim 27, wherein the plurality of nodes comprise a root node representing the first user, a plurality of key nodes each of which representing a respective relationship type and directly linked to the root node by a respective one of the links, and a plurality of nodes each of which directly or indirectly linked to a respective one of the key nodes.

29. The system of claim 27, wherein the assigning comprises calculating the private degree value for each of the plurality of links based on a maximal distance in the ontological model and an inverse proportional relationship between the private degree value and a distance between respective two nodes.

30. The system of claim 27, wherein the establishing the ontological model further comprises:
assigning an initial value for the degree of closeness between the first user and the second user;
tracking a frequency of communications between the first user and the second user over a predefined period of time;
tracking a total amount of time of communications between the first user and the second user over the predefined period of time; and
recording one or more special remarks that impact the degree of closeness between the first user and the second user.

31. The system of claim 26, wherein the analyzing a content of a first communication between the first user and the second user comprises:
segmenting the content of the first communication into a plurality of sentences, each of the plurality of sentences including a set of one or more words; and
mapping one or more of the plurality of sentences onto the ontological model.

32. The system of claim 31, wherein the mapping one or more of the plurality of sentences onto the ontological model comprises:
determining whether one or more words in each of the plurality of sentences connects two linked nodes in the ontological model;
mapping the one or more words in each of the plurality of sentences in response to determining that the one or more sentences in each of the plurality of sentences connects two linked nodes in the ontological model; and
determining that a sentence is irrelevant in response to no word in the sentence is mapped to the ontological model.

33. The system of claim 31, wherein the analyzing a content of a first communication between the first user and the second user further comprises:
reasoning each of the mapped one or more of the plurality of sentences to determine whether information conveyed in each mapped sentence is deducible from the ontological model, not deducible from the ontological model, or inconsistent with the ontological model; and
identifying a set of a minimal number of relational axioms from a plurality of relational axioms of the ontological model that can satisfy justification for deducibility and inconsistency in the determining,
wherein each of the relational axioms defines a relationship between two concepts with respect to the first user in the ontological model.

34. The system of claim 33, wherein the determining a degree of closeness between the first user and the second user using the ontological model and a result of the analyzing comprises:
increasing a calculated degree of closeness in response to determining that the information conveyed in the respective mapped sentence is deducible from the ontological model; and
decreasing the calculated degree of closeness in response to determining that the information conveyed in the respective mapped sentence is not deducible from the ontological model.

35. The system of claim 33, wherein the analyzing a content of a first communication between the first user and the second user further comprises:
calculating, for the set of minimal number of relational axioms, a respective value of contribution to the degree of closeness in each dimension of a plurality of dimensions of relationship with respect to the first user.

36. The system of claim 35, wherein the determining a degree of closeness between the first user and the second user using the ontological model and a result of the analyzing comprises:
summing the values of contribution to the degree of closeness associated with the set of minimal number of relational axioms in the plurality of dimensions of relationship to provide a total closeness value.

37. The system of claim 36, wherein the summing the values of contribution to the degree of closeness comprises updating the values of contribution to the degree of closeness in each dimension of the plurality of dimensions of relationship with a frequency and a total amount of time of communications between the first user and the second user over a predefined period of time.

38. The system of claim 25, wherein the pattern of communications between the first user and the second user comprises a frequency of communications between the first user and the second user over a predefined period of time.

39. The system of claim 25, wherein the second component is configured to update the degree of closeness by decaying the degree of closeness between the first user and the second user until an occurrence of a second communication between the first user and the second user.

\* \* \* \* \*